(12) United States Patent
Kim

(10) Patent No.: US 6,427,520 B2
(45) Date of Patent: Aug. 6, 2002

(54) VEHICLE SIDE IMPACT TEST APPARATUS

(75) Inventor: Sang-Kyun Kim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/733,118

(22) Filed: Dec. 8, 2000

(30) Foreign Application Priority Data

Dec. 10, 1999 (KR) .............................................. 99-56533

(51) Int. Cl.[7] .............................................. G01M 7/00
(52) U.S. Cl. ...................................... 73/12.04; 73/12.09
(58) Field of Search ................................. 73/12.01, 12.04, 73/12.09

(56) References Cited

U.S. PATENT DOCUMENTS

| | | | | |
|---|---|---|---|---|
| 5,485,758 A | * | 1/1996 | Brown et al. | 73/865.8 |
| 5,652,375 A | * | 7/1997 | DA Re' | 73/12.04 |
| 6,178,805 B1 | * | 1/2001 | Kosaraju et al. | 73/12.04 |
| 6,256,601 B1 | * | 7/2001 | Wipasuramonton et al. | 703/8 |

* cited by examiner

Primary Examiner—Max Noori
(74) Attorney, Agent, or Firm—Christie, Parker & Hale, LLP

(57) ABSTRACT

A vehicle's side impact test apparatus includes an impact pole fixedly projected from a barrier, and a vehicle carrier system for propelling a test vehicle to the impact pole.

6 Claims, 4 Drawing Sheets

VEHICLE SIDE IMPACT TEST APPARATUS

CROSS-REFERENCE TO RELATED APPLICATION

This application claims priority of Korea patent Application No. 99-56533, filed on Dec. 10, 1999.

BACKGROUND OF THE INVENTION (a) Field of the Invention

The present invention relates to an apparatus for testing a vehicle's resistance to a side impact, which is improved in that the vehicle to be tested moves in a sideways direction relative to its driving direction using a roll mechanism.

(b) Description of the Related Art

Generally, when a new type of car is developed by an automaker, various tests are conducted for analyzing that the vehicle's structural integrity is in compliance with security and stability standards. Since safety characteristics are directly related to occupants' lives, the safety standards for vehicles are strictly stipulated all around the world.

The safety characteristics are analyzed using various impact tests such as a front crash test and a side impact test by way of a vehicle crashing into a target vehicle.

Particularly, the side impact test is performed by sliding a test vehicle on a slippery road to crash it into a pole fixedly projected from a barrier.

In this side impact test, however, the vehicle is propelled in a direction perpendicular to its normal driving direction such that it is difficult to set crash conditions such as the impact speed and impact angle. Also, it is time consuming to reset the impact test system for repetitive impact tests.

SUMMARY OF THE INVENTION

The present invention has been made in an effort to solve the above problems of the prior art.

It is an object of the present invention to provide a vehicle side impact test apparatus capable of testing a vehicle's structural integrity in various conditions and reducing reset time for repetitive experiments.

To achieve the above object, a vehicle side impact test apparatus of the present invention comprises an impact pole fixedly projected from a barrier and a vehicle carrier system for propelling a test vehicle to the impact pole along a leading road.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 1:
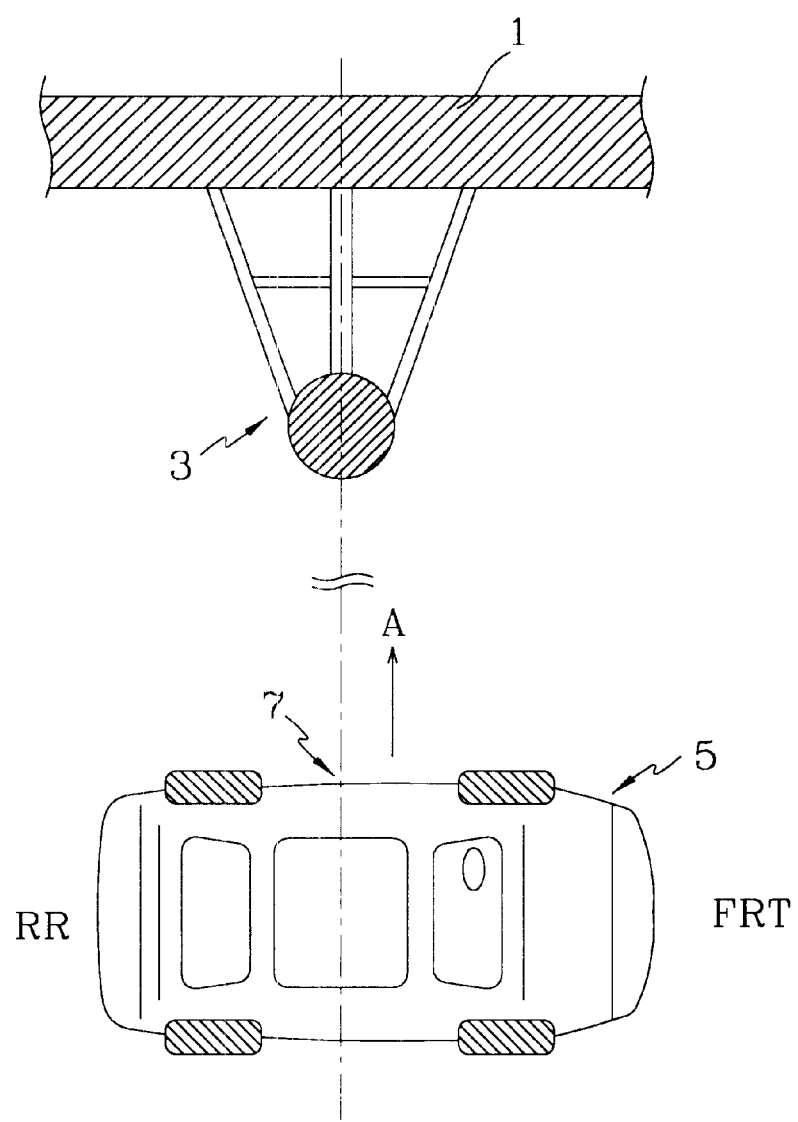
FIG. 1 is a schematic view of a side impact test apparatus of the present invention.

As shown in FIG. 1, the side impact test apparatus comprises an impact pole 3 fixedly projected from a barrier 1 and a vehicle carrier system having four carriers 8 (see FIG. 2) for carrying a test vehicle 5 from a predetermined distance to the impact pole 3 along a leading road.

The impact pole is set over an overall height of the vehicle and to confront a side of the test vehicle.

Figure 2:
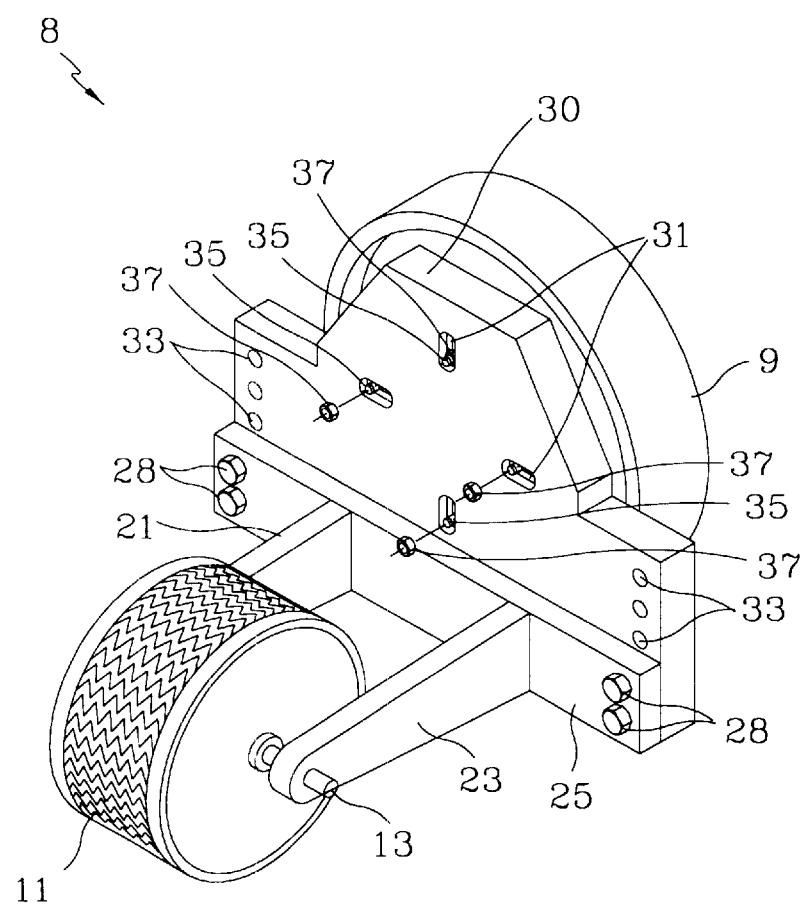
FIG. 2 is a perspective view of a rolling system of the side impact test apparatus of FIG. 1 according to a first preferred embodiment.
Figure 3:
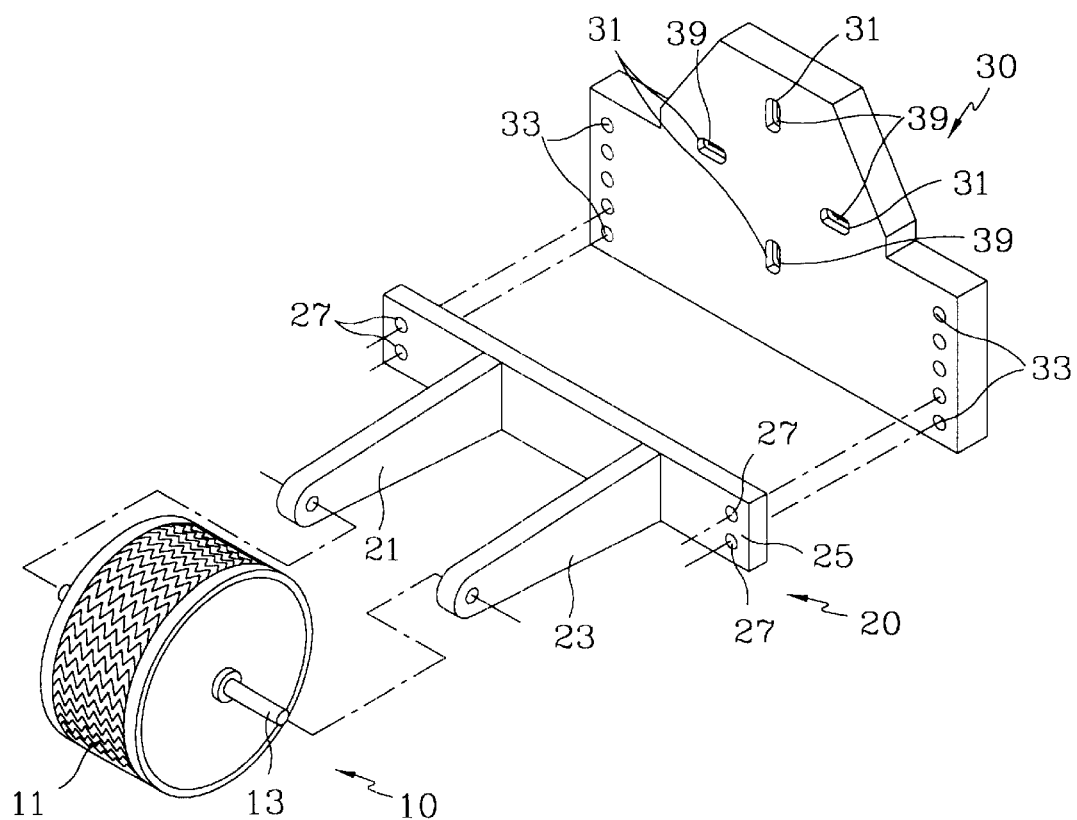
FIG. 3 is an exploded perspective view of the rolling system of FIG. 2.

FIG. 2 and FIG. 3 show a carrier 8 of the side impact test apparatus.

The carrier 8 is installed to each wheel hub 9 of the test vehicle 5 so as to carry the test vehicle 5 in a direction perpendicular to the vehicle's normal driving direction.

The carrier 8 comprises a rolling member 10 having a roller 11 with a predetermined radius and a shaft 13 penetrating a center of the roller 11 so as to act as a rolling axis of the roller 11, a support member 20 comprising a support plate 25 and a pair of parallel arms 21 and 23 projected at right angles from a front surface of the support plate 25 so as to rotatively connect the rolling member 10 to the support member 20 between the arms 21 and 23 by inserting ends of the shaft 13 of the rolling member 10 into holes formed at end portions of the arms 21 and 23 of the support member 20. A mounting plate 30 is fixed to the support member 20 by contacting a back surface of the support plate 25 to a front surface of the mounting plate 30 and being fixed to each other by screwing bolts 28 through into the holes 27 formed on both end portions of the support plate 25 and holes 33 formed on both end portions of the mounting plate 30.

The mounting plate 30 has an upwardly projected portion with respect to the width thereof, on which four coupling slots 31 are circumferentially formed at a predetermined angle to each other corresponding to the bolt pattern of the wheel hub 9 of the test vehicle 5.

The number of the coupling slots 31 is not limited to four, but the mounting plate 30 could be modified to have a different number of coupling slots.

Figure 4:
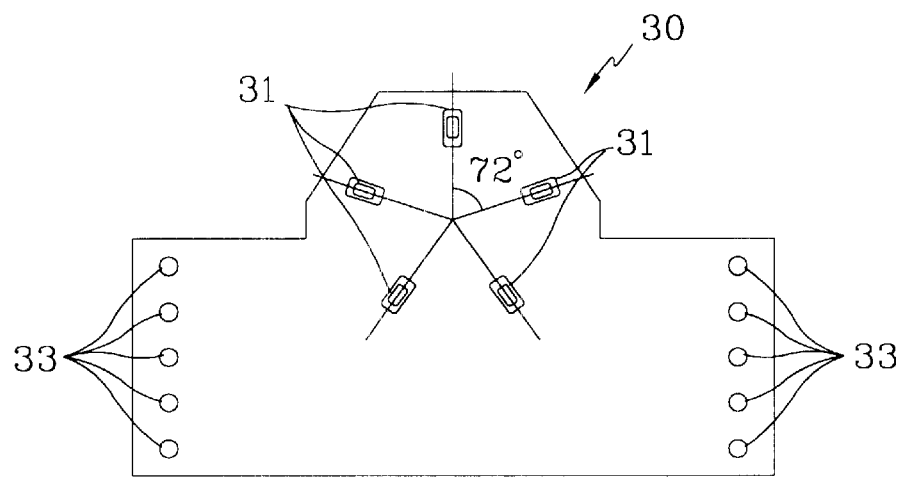
FIG. 4 is a front view of a hub mounting plate of the rolling system according to a second preferred embodiment of the present invention.
Figure 5:
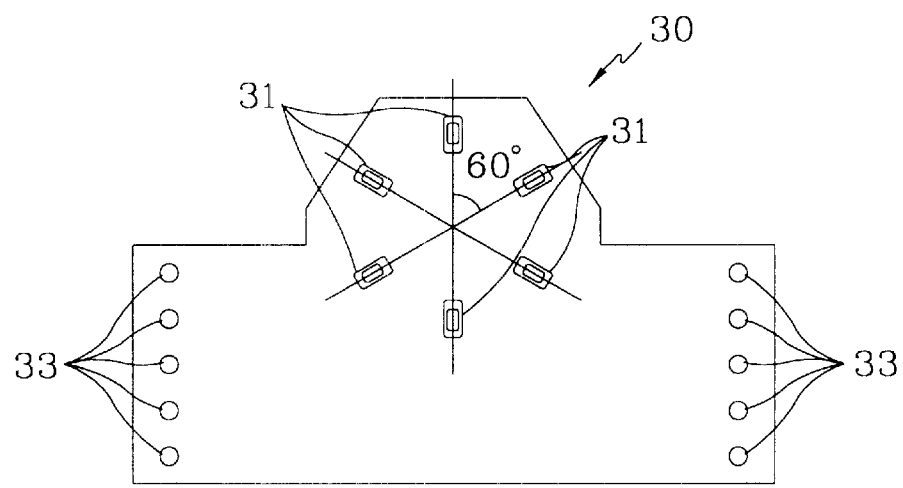
FIG. 5 is a front view of a hub mounting plate of the rolling system according to a third preferred embodiment of the present invention.

FIG. 4 and FIG. 5 show mounting plates respectively providing five coupling slot holes formed at angles of 72° and six coupling slot holes formed at angles 60° according to other preferred embodiments of the present invention.

The above structured carrier 8 is connected to each wheel hub 9 of the test vehicle 5 by screwing nuts 37 on the studs penetrating the coupling slots 31 after the wheels of the vehicle have been removed such that the carrier 8 leads the test vehicle 5 to move sideways with a low friction force to the road.

As described above, in the vehicle's side impact test apparatus, the vehicle carrier system carries the test vehicle sideways so as to effectively test the vehicle's structural integrity in various conditions and reduce the reset time for repetitive experiments.

While this invention has been described in connection with what is presently considered to be the most practical exemplary embodiment, it is to be understood that the invention is not limited to the disclosed embodiments, but, on the contrary, is intended to cover various modifications and equivalent arrangements included within the spirit and scope of the appended claims.

What is claimed is:

1. A vehicle's side impact test apparatus comprising:

an impact pole fixedly projected from a barrier; and a vehicle carrier system for propelling a test vehicle to sideway impact the impact pole, the vehicle carrier system having four carriers, each carrier comprising, a rolling member a support member rotatively connected to the rolling member, and a mounting plate fixed to the support member for mounting the carrier to a wheel hub.

2. A vehicle's side impact test apparatus of claim 1 wherein the rolling member comprises:

a roller; amd a shaft penetrating a center of the roller for providing a rotational axis to the roller.

3. A vehicle's side impact test apparatus of claim 1 wherein the support member comprises:

a support plate having fixing holes on both side end portions thereof for fixing the support to the mounting plate; and a pair of arms vertically projected from a front surface of the support plate in parallel for rotatively receiving the rolling member between the arms.

4. A vehicle's side impact test apparatus of claim 1 wherein the mounting plate is provided with a plurality of fixing holes on both side end portions for fixing the support member to the mounting plate.

5. A vehicle's side impact test apparatus of claim 1 wherein the mounting plate has an upwardly projected portion with respect to a width thereof such that a plurality of coupling openings are circumferentially formed with a predetermined angle to each other for receiving studs of a wheel hub.

6. A vehicle's side impact test apparatus of claim 5 wherein the coupling openings are elongated slots.

* * * * *